Nov. 2, 1937.  W. FOLEY  2,097,811
TIRE GROOVING TOOL
Filed Nov. 3, 1934
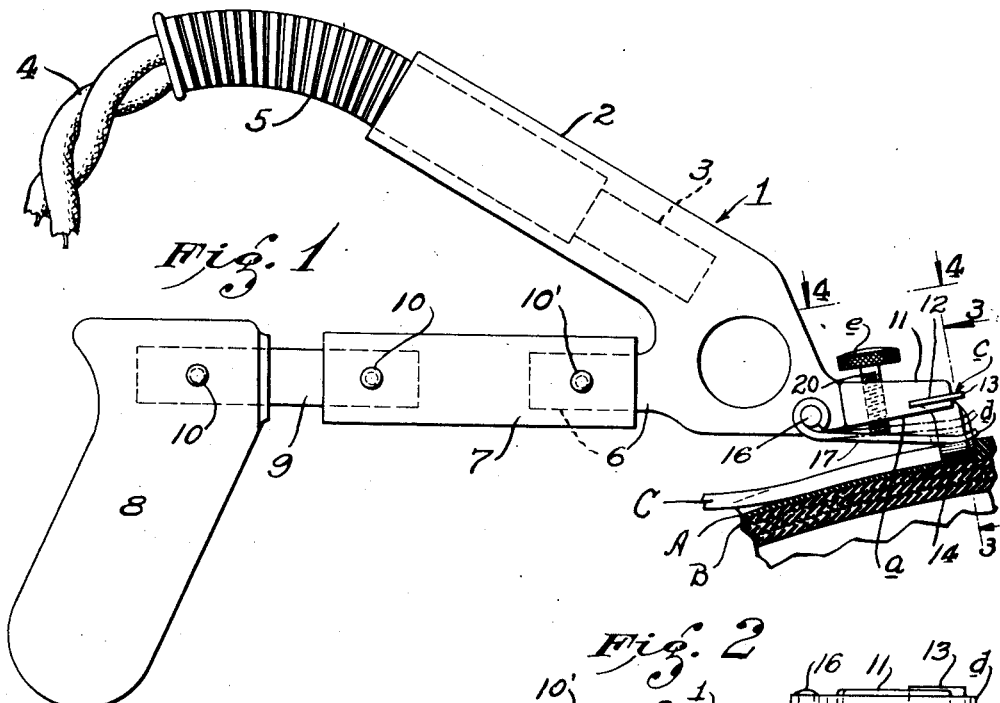
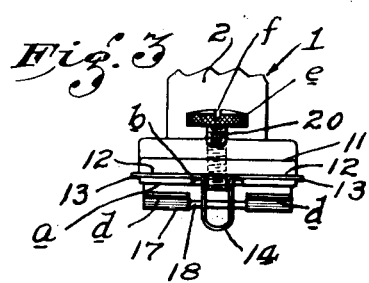
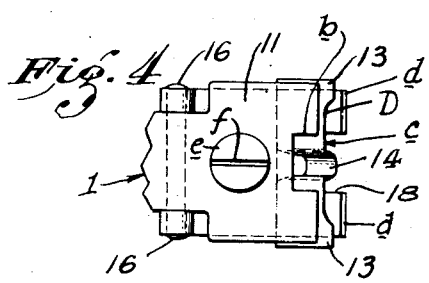
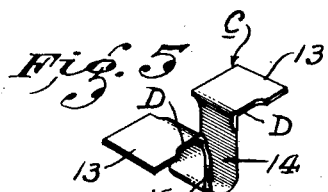
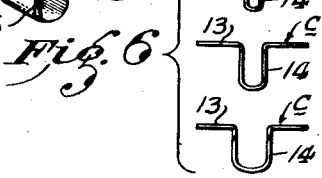
INVENTOR
Walter Foley
BY
*Larrabee*
his ATTORNEY.

Patented Nov. 2, 1937

2,097,811

UNITED STATES PATENT OFFICE 2,097,811

TIRE GROOVING TOOL

Walter Foley, Los Angeles, Calif.

Application November 3, 1934, Serial No. 751,375

19 Claims. (Cl. 30—140)

My invention relates to a tire grooving tool and particularly to a tool that is electrically heated and by the use of which treads may be recut into tires that have become wholly or partly smooth from use, whereby the appearance of the tire as well as its non-skid properties may be restored to closely simulate the grooves and appearance of a new tire.

An object of my invention is to provide a novel tire grooving tool which is simple and economical of construction and which may be easily and quickly adapted to cut a groove or tread of the desired depth without removing the cutting blade from the device.

An object is to provide a novel device wherein the depth of cut of the cutting blade may be varied while the blade is in heated condition and without removing the blade from its mounted and operative position in the tool.

An object of my invention is to provide a novel tire grooving tool in which the cutting edge of the blade is not obstructed from the view of the operator by other parts of the tool.

Another object of my invention is to provide a novel tire grooving tool in which the strip cut from the tire to form the groove will not be deflected onto the top of the tool so as to obstruct the view of the operator to the cutting blade so that the tool may be easily guided over the pattern desired to be cut into the tire periphery.

Another object is to provide a novel, simple and compact tool of the above character having a minimum overall length so that various angular cuts may be made with a minimum of lost motion on the part of the operator.

Another object is to provide a novel tire grooving tool of the above character in which cutting blades of various widths may be easily and quickly interchanged one with the other and in which the depth of cut to be effected by such blade may be easily and quickly adjusted.

A still further object of my invention is to provide a novel tire grooving tool in which the depth of cut obtained by the cutting blade may be varied from a minimum depth to a maximum depth while the cutting blade is mounted for use and in heated condition, thereby eliminating loss of time otherwise required to re-heat blades if different depth blades are substituted.

The invention includes the parts and combinations of parts more particularly hereinafter described in detail and pointed out in the appended claims.

Other objects, advantages and features of invention may appear from the accompanying drawing, the subjoined detail description and the appended claims.

The accompanying drawing illustrates the invention in a form I at present deem preferable.

Figure 1 is a side elevational view of my novel tire grooving tool associated with a fragmentary portion of a tire being grooved, and which is shown in section. Dot and dash lines indicate an adjusted position of the depth gauging shoe, and the electric energy connection cord is broken away to contract the view.

Fig. 2 is a fragmentary bottom view of the forward end of my tire grooving tool.

Fig. 3 is a fragmentary front end elevational view, taken on a plane indicated by line 3—3, Fig. 1.

Fig. 4 is a fragmentary top or plan view of the forward end of said tool, as viewed on line 4—4, Fig. 1.

Fig. 5 is a perspective detail view of a grooving or cutting blade, detached from its holder.

Fig. 6 illustrates in end elevation a group of cutting blades of varied widths.

My invention comprises a body member 1 of copper, brass or other good heat-conducting material and is provided with an upstanding arm portion 2 that preferably extends at an angle therefrom, in a direction upwardly and rearwardly from the body member or portion 1, as shown in Fig. 1. An electric heating element 3 (shown in dotted lines, Fig. 1) is of any suitable construction embedded in arm portion 2 and is connected to a source of electrical energy through an electric cord 4, the end of which adjacent arm portion 2 is protected from undue flexure by a coil spring guard member 5 that encircles the cord 4.

A stub member 6 extends rearwardly from the body member 1 and preferably underneath arm portion 2 and is received in any suitable block or sleeve 7 of insulating material, to which a pistol grip handle 8 is connected by a projecting member 9 that is secured non-rotatably relative to sleeve 9 and handle 8 by any suitable means, as by the rivets 10. The rivet 10' non-rotatably secures the sleeve 7 to the stub member 6.

The forward end 11 of member 1 extends slightly upward on its under or lower surface a, and such end 11 projects laterally beyond the sides of body member 1, preferably as shown in Figs. 2–4.

The forward end or edge 11 of body member 1 is provided with a horizontal slot 12, that extends substantially parallel with and adjacent the lower surface a thereof, and is notched or provided with a recess along its forward edge, as at b.

A grooving knife or cutting blade c is provided with a looped portion intermediate its ends in the form of a central substantially U-shaped portion 14 that is sharpened along the beveled cutting edge 15 and the ends 13 of said blade c extend into the slot 12 into which they slidably but snugly fit so that the cutter blade is held in place by slight friction thereon, and when in place the central U-shaped portion is received in recess b.

The blade c is heated by heat conducted thereto from body member 1 which is heated in the first instance by the element 3.

Blade c may be formed of any suitable sheet material which is preferably of such character that it will retain its cutting edge when heated to its operating temperature, and may be easily withdrawn from, or placed in, slot 12 thereby providing for ease and quickness of substituting one blade for another, either of the same size or of a different width as shown in Fig. 6.

Means for regulating or varying the depth to which the blade c may enter the tire tread rubber A is provided and comprises a shoe 17 that is pivoted at one end, as at 16, to the body member 1 and is provided with an upturned edge d at its other or free end to provide for easy movement of the tool over the surface of the tire being regrooved. The shoe 17 is notched at its forward end as at 18, to receive and straddle the U-shaped portion 14 of blade c. A screw 20 threaded through the forward end 11 of body member 1 engages shoe 17 and predetermines the distance between surface a and the shoe 17 as well as the distance the U-shaped portion 14 projects from the underside of shoe 17. In operation pressure of the shoe 17 upon the tire will maintain the shoe 17 in contact with screw 20. A knurled head e provided with a screw driver slot or kerf f provides easy means for adjustment of screw 20 whether the tool is hot or cold; and the pivotal connection 16 is preferably of sufficient frictional tightness as to prevent the shoe 17 from freely swinging thereabout.

In operation, the operator from experience first adjusts the shoe 17 so that the knife or blade c projects therebelow a predetermined distance and the tool having been first heated to the desired cutting temperature a trial cut may be made and the tool slightly raised to view the cut being made, and in the event too deep a cut is being taken through the tread rubber A, the same will be disclosed to the operator by the fact that the layer B of undercover rubber lying immediately underneath the tread rubber A will be entered, and such layer of undercover rubber is in all makes of tires at present of a different color than that of the tread rubber. In the event too deep a cut is being made the screw 20 may be quickly adjusted without great loss of time or withdrawing the tool from the cut being made; or requiring replacement of the blade c with another blade of same width, but less or greater depth, and being required to await the heating thereof to the required temperature before resuming cutting operations.

The strip C of tread rubber that is severed by the knife or blade c passes entirely through the U-shaped portion 14 thereof which is open ended as seen in Figs. 3-6, and remains within the groove from which it has been cut, and therefore is out of the way of the operator's vision while grooving a tire.

It will also be seen that the forward edge of the blade itself protrudes from the front end 11 of body member 1 and is throughout a portion of its length recessed or cut-back as at D so that such forward or cutting edge will be visible at all times through the notch in said body member for easy guidance over the pattern to be cut in the tire and will not be hidden either by parts of the tool itself or the strips of rubber cut from the tire by the tool.

It will also be apparent that the looped portion 14 may be, and is to be considered to be, of either a substantial U-shape in cross-section, or of a substantially V-shape, or it may even be a square shape without departing from the spirit of my invention, and the term U-shape is intended to include and embrace all of these various cross-sectional shapes.

I claim:

1. In a tire grooving tool, a body member having a slot therein to receive a grooving blade; a heating element connected to said body member; a grooving blade carried by said body member and projecting below the lower face thereof and slidably received in said slot; and means for regulating the depth of the groove to be cut by said blade while said blade is in the said slot, and whereby the portion being cut by said blade is visible to the operator.

2. In a tire grooving tool, a body member; a grooving blade carried by said body member and projecting below the lower face thereof; means to heat said blade; and a shoe pivotally connected to said member and adjustable relative to the projecting portion of said blade to adjust the cutting depth of said blade.

3. In a tire grooving tool, a body member having a slot; a grooving blade having a substantially U-shaped cutting portion and portions extending therefrom and insertable in said slot; a rigid notched shoe pivotally connected to said member and the notch therein straddling said U-shaped cutting portion; and means to regulate said shoe relative to the base of said U-shaped cutting portion to determine the depth of cutting surface thereof.

4. In a tire grooving tool, a body member; a grooving blade having a substantially U-shaped cutting portion carried by said member; a notched shoe pivotally connected to said member and the notch therein straddling said U-shaped cutting portion; means to regulate said shoe relative to the underside of the body member and base of said U-shaped cutting portion to determine the depth of cutting surface thereof; and means to heat said grooving blade.

5. In a tire grooving tool, a body member; a grooving blade having a substantially U-shaped cutting portion carried by said member; a notched shoe pivotally connected to said member and the notch therein straddling said U-shaped cutting portion; means to regulate said shoe relative to the underside of the body member and base of said U-shaped cutting portion to determine the depth of cutting surface thereof; means to heat said grooving blade; and a pistol grip handle extending from said member for propelling said blade.

6. In a tire grooving tool, a body member; a cutting blade carried thereby and having a portion extending below the lower face of said member; and means connected to, and extending along the underside of, said body member and straddling the said extending portion of said blade to predetermine the effective cutting depth of said blade portion that extends below said member.

7. In a tire grooving tool, a body member; a cutting blade carried thereby and having a portion extending below the lower face of said member; means connected to said body member for adjustment relative thereto, to predetermine the effective cutting depth of said blade portion that extends below said member and whereby the portion being cut will be visible to the operator; and means to heat said cutting blade.

8. In a tire grooving tool, a body member; a cutting blade carried thereby and having a portion extending below the lower face of said member; means connected to said body member for adjustment relative thereto to predetermine the effective cutting depth of said blade portion that extends below said member and whereby the portion being cut will be visible to the operator; means to heat said cutting blade; and a handle extending from said member for propelling said blade.

9. In a tire grooving tool, a body member; a cutting blade in fixed relation to said member and including a substantially U-shaped cutting portion carried by said member; means for heating said blade; and a depth regulating device for said blade cutting portion, including a shoe arranged to straddle the blade cutting portion.

10. In a tire grooving tool, a body member; a cutting blade having a looped portion intermediate its ends; and a depth regulating device for said blade including a shoe pivotally connected to said body member to expose a predetermined distance of said looped portion for effective cutting operations.

11. In a tire grooving tool, a body member having a slotted end and a notch on its lower surface; a cutting blade removably secured in said slotted end and having a looped portion extending through said notch; a shoe pivotally connected to said member and having a notch at its forward end to straddle the looped portion of said blade; and means to maintain said shoe in predetermined position relative to said member and said blade.

12. In a tire grooving tool, a body member having a slotted end and a notch on its lower surface; a cutting blade removably secured in said slotted end and having a looped portion extending through said notch; a shoe pivotally connected to said member and having a notch at its forward end to straddle the looped portion of said blade; and means to maintain said shoe in predetermined position relative to said member and said blade, said looped portion being open from end to end below said shoe.

13. In a tire grooving tool, a body member having a slotted end and a notch on its lower surface; a cutting blade removably secured in said slotted end and having a looped portion extending through said notch; a shoe pivotally connected to said member and having a notch at its forward end to straddle the looped portion of said blade, said shoe having its free end upturned; and means to maintain said shoe in predetermined position relative to said member and said blade.

14. In a tire grooving tool, a cutting blade having a looped portion intermediate its ends and attaching portions extending outwardly from the ends of said looped portion, said looped portion having a cutting edge, and said attaching portions and looped portion being recessed or cut back throughout a portion of their length.

15. In a tire grooving tool, a body member having an arm portion extending at an angle therefrom; heating means connected to said arm portion; a stub member extending from said body member; a handle connected to, and insulated from said stub member; a cutting blade carried by said body member at the forward end thereof and having a portion extending below the undersurface thereof; a shoe pivoted to said body portion and straddling the portion of said blade extending below said body member; and means to vary said shoe relative to the undersurface of said body member and along the extending portion of said blade to vary the distance said blade extends below said shoe.

16. A grooving implement comprising a body member; a cutting blade projecting from said body member; a handle projecting from said body member; a guard member pivotally connected to said body member and having an aperture portion adjacent said blade, said blade projecting through the aperture of said guard member; and means for adjustably securing said guard member relative to said body member and said blade to vary the distance said blade projects below the aperture in said guard member.

17. A grooving tool comprising a combination of a blade holder member; a blade having a looped portion intermediate its ends and attaching portions extending laterally from the ends of said looped portion, said looped portion extending forwardly beyond said holder member, and said attaching portions supporting said blade from said holder member; and the looped portion and said attaching portions being recessed along their upper and forward edges.

18. In a tire grooving tool, a body member having an upstanding arm portion; an electric heating element connected to said arm portion; a handle member connected to and insulated from said body portion; the forward end of said body member being provided with a slot and a notch; a shoe pivotally connected at one end to said member and being free at its other end and provided with a notch at its free end; a cutting blade provided with a looped portion intermediate its ends and attaching portions extending from the ends of said looped portion, said attaching portions being received in said slot and said looped portion being received in the notch in said body and member and said shoe; and means adjustably secured to said body member and adapted to engage said shoe to vary the distance said looper portion extends below said shoe whereby when pressure is applied against the underside of said shoe the said shoe will be maintained in adjusted position against said adjustable means.

19. In a tire grooving tool, a body member having an upstanding arm portion; the forward end of said body member being provided with a slot and a notch; an electric heating element connected to said arm portion; a handle member connected to and insulated from said body portion; a shoe pivotally connected at one end to said member and being free at its other end and provided with a notch at its free end; a cutting blade provided with a looped portion intermediate its ends and attaching portions extending from the ends of said looped portion, said attaching portions being received in said slot and said looped portion being received in the notch in said body member and said shoe and having a cutting edge; means adjustably secured to said body member and adapted to engage said shoe to vary the distance said looped portion extends below said shoe whereby when pressure is applied against the underside of said shoe the said shoe will be maintained in adjusted position against said adjustable means; and said looped portion and attaching portions being recessed throughout a portion of their length so that the said cutting edge is visible through the notches in said body member and shoe.

WALTER FOLEY.